United States Patent Office 3,325,530
Patented June 13, 1967

3,325,530
METHOD FOR MAKING ORGANOSILICON COPOLYMERS
Tse C. Wu, Waterford, N.Y., assignor to General Electric Company, a corporation of New York
No Drawing. Continuation of abandoned application Ser. No. 299,171, Aug. 1, 1963. This application Apr. 18, 1966, Ser. No. 543,014
1 Claim. (Cl. 260—46.5)

This application is a continuation of my copending application Ser. No. 299,171 filed Aug. 1, 1963, now abandoned, and assigned to the same assignee as the present invention.

This invention relates to new and useful copolymers. More particularly, it relates to polymers of the silicone type containing bis-(diarylsilyl)benzene units and diphenylsiloxane units, which copolymers are characterized by improved thermal stability.

The silicone art has long known that the incorporation of aromatic groups into organopolysiloxane polymers enhances the thermal stability of such polymers and polymeric materials consisting entirely of diphenylsiloxane units have been known in the art. While these materials have had enhanced thermal stability, they have been characterized by extreme brittleness which has made them rather unsatisfactory for most silicone polymer applications.

The present invention is based on my discovery of a silicone polymer which has the enhanced thermal stability expected of phenyl-containing organopolysiloxanes, but which, in addition, does not exhibit the extremely brittle characteristics usually found in prior art materials.

More particularly, the present invention is based on my discovery of a new class of organosilicon polymers having the formula, (1) 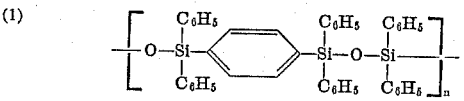

where $n$ has a value of more than one, e.g., from three to fifty or more.

The polymers of the present invention are prepared by effecting reaction between 1,4-bis(diphenylhydroxylsilyl)benzene and diphenyldichlorosilane. In general, the reaction to prepare the copolymers of the present invention is effected by employing equimolar proportions of the 1,4-bis(diphenylhydroxysilyl)benzene and diphenyldichlorosilane. Generally, the diphenyldichlorosilane is slowly added to a solution of the other reactant in the presence of a hydrogen halide acceptor such as pyridine and in the presence of a suitable solvent. Included among such solvents can be mentioned any material which is a solvent for the reactants and which is inert under the conditions of the reaction. A particularly desirable solvent is tetrahydrofuran. In general, the pyridine is present in an amount sufficient to provide at least one mole of pyridine per mole of diphenyldichlorosilane but the reaction can be satisfactorily effected employing the pyridine in an amount equal to from 0.25 to 5 moles per mole of the diphenyldichlorosilane. The amount of solvent employed is not critical but generally a sufficient amount is employed to insure complete solution of the reactants. Generally, the amount of solvent employed is equal to about 1 to 10 parts, per part of the reactants and the hydrogen halide acceptor. The reaction is effected by merely maintaining the reaction mixture, preferably with stirring, at room temperature for a period of from 5 to 20 or more hours, and the reaction product is filtered from the reaction mixture and the product is stripped under reduced pressure to remove any solvent or hydrogen halide acceptor remaining in the reaction mixture.

1,4-bis(diphenylhydroxysilyl)benzene is prepared from 1,4-bis(diphenylchlorosilyl)benzene by the dropwise addition of a solution containing 10 parts of the latter compound and 45 parts of tetrahydrofuran to a suspension containing 10 parts of sodium bicarbonate and 35 parts of ether saturated with water. Carbon dioxide gas is evolved during the addition and the reaction mixture is stirred for about 16 hours at room temperature. The reaction mixture is then filtered by suction to remove the sodium salts and the filtrate is distilled to leave a solid residue having a melting point of 180 to 190° C. This residue is then purified in a Soxhlet extractor with toluene to yield 5.2 parts of 1,4-bis(diphenylhydroxysilyl)benzene in the form of bright needles melting at 212 to 214° C.

The 1,4-bis(diphenylchlorosilyl)benzene can be prepared by the reaction of a butyl lithium solution with p-dibromobenzene. A solution containing 2.2 moles of butyl lithium per liter of a solvent which is a mixture of three volumes of heptane and one volume of pentane is used as the source of the butyl lithium. One liter of the butyl lithium solution is added under a nitrogen atmosphere to 236 grams (1 mole) of p-dibromobenzene in one liter of petroleum ether. After stirring the mixture at room temperature for 20 hours, the mixture is then added dropwise to 964 grams (4 moles) of diphenyldichlorosilane dissolved in one liter of petroleum ether. A gentle reflux is maintained during the addition and the reaction mixture is then stirred at room temperature for 8 hours. The reaction mixture is filtered and the residue from the filtration is stirred in toluene and filtered. The toluene filtrate is then distilled to produce 250 grams of an oily semi-solid residue which is washed with petroleum ether to dissolve impurities and the resulting solid is dried in an oven at 110° C. to give 75 grams of a white powder melting at 175 to 180° C. This material is further purified by recrystallization from ethyl orthoformate to produce 1,4-bis(diphenylchlorosilyl)benzene having a melting point of from 183 to 185° C.

The following example is illustrative of the practice of my invention and is not intended for purposes of limitation.

Example 1

A polymer within the scope of the present invention was prepared by reacting 1,4-bis(diphenylhydroxysilyl)benzene with diphenyldichlorosilane. Diphenyldichlorosilane (1.88 parts) was added dropwise to a solution containing 3.52 parts of 1,4-bis(diphenylhydroxysilyl)benzene, 1 part pyridine and 25 parts of anhydrous tetrahydrofuran. A white precipitate formed and the mixture was stirred for about 16 hours at room temperature and filtered. The filtrate was distilled to remove the solvent, leaving a gummy residue which solidified at room temperature to form a resinous product having the formula,

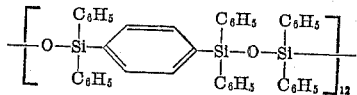

The weight loss at elevated temperature of this product is considerably less than that of a high molecular weight diphenylpolysiloxane. For example, after heating at 355°

C. for 4 hours, the weight loss was only 18 percent. After 8 hours of such heating, the further weight loss was only 3.6 percent. After further heating for 4 hours at 410° C., the additional weight loss was only 2.5 percent.

While the foregoing example has illustrated the preparation of a single copolymer within the scope of the present invention, it should be understood that polymers different from the material of the example can be prepared by increasing the temperature at which the reaction is effected or lowering the temperature. It has been found that the molecular weight is a rough function of the reaction temperature so that lower molecular weight materials can be prepared by effecting reaction at temperatures slightly below room temperature while higher molecular weight materials are prepared with temperatures above room temperature, e.g., temperatures on the order of from 25 to 50° C. No particular advantage is derived from effecting reaction between the diphenyldichlorosilane and the 1,4-bis(diphenylhydroxysilyl)benzene at temperatures significantly in excess of 50° C.

The polymeric materials within the scope of the present invention are extremely useful as insulation for electrical conductors. For example, the materials within the scope of the present invention can be dissolved in diphenyl ether forming solutions having a solids content of about 50 percent. Electrical conductors, such as copper wire, can be passed through these solutions and through a wire tower to evaporate the solvent, leaving a tough, flexible, continuous film of the polymers of the present invention as insulation on the electrical conductors.

What I claim as new and desire to secure by Letters Patent of the United States is:

A method for preparing an organosilicon polymer having the formula:

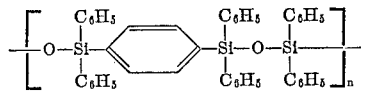

where $n$ has a value of more than one, which comprises effecting contact under substantially anhydrous conditions and at a temperature between 25° C. to 50° C. between equal molar amounts of 1,4-bis(diphenylhydroxysilyl)benzene and diphenyldichlorosilane in the presence of an inert organic solvent and a hydrogen halide acceptor.

References Cited

UNITED STATES PATENTS

| | | | |
|---|---|---|---|
| 2,695,307 | 11/1954 | Guillissen et al. | 260—46.5 |
| 3,122,579 | 2/1964 | Leitheiser | 260—46.5 |
| 3,135,777 | 6/1964 | Nielsen | 260—448.20 |
| 3,200,137 | 8/1965 | Omietanski | 260—46.5 |
| 3,202,634 | 8/1965 | Merker | 260—46.5 |

FOREIGN PATENTS

| | | |
|---|---|---|
| 1,405,596 | 5/1965 | France. |

DONALD E. CZAJA, *Primary Examiner.*

LEON J. BERCOVITZ, M. I. MARQUIS,
*Assistant Examiners.*